United States Patent [19]
Pal et al.

[11] Patent Number: 4,912,553
[45] Date of Patent: Mar. 27, 1990

[54] WIDEBAND VIDEO SYSTEM FOR SINGLE POWER LINE COMMUNICATIONS

[76] Inventors: Theodore L. Pal, 21721 Newvale Dr.; Christian Ivanescu, 22051 Newbridge Dr., both of El Toro, Calif. 92630

[21] Appl. No.: 188,494

[22] Filed: Apr. 29, 1988

Related U.S. Application Data

[63] Continuation-in-part of Ser. No. 845,236, Mar. 28, 1986, abandoned.

[51] Int. Cl.$^4$ .............................................. H04N 7/10
[52] U.S. Cl. ................................. 358/86; 340/310 A
[58] Field of Search ................... 379/66; 340/310 A; 358/86

[56] References Cited

U.S. PATENT DOCUMENTS

| | | | |
|---|---|---|---|
| 1,669,589 | 5/1928 | Buttner | 379/66 |
| 2,654,805 | 10/1953 | Derr | 379/66 X |
| 3,093,706 | 6/1963 | Karplus | 178/5.6 |
| 3,280,259 | 10/1966 | Cotter | 379/66 X |
| 3,369,078 | 2/1968 | Stradley | 340/310 A X |
| 4,012,733 | 3/1977 | Whyte | 340/310 A |
| 4,016,429 | 4/1977 | Vercellotti et al. | 340/310 A X |
| 4,054,910 | 10/1977 | Chou et al. | 358/86 |
| 4,101,834 | 7/1978 | Stutt et al. | 325/42 |
| 4,103,337 | 7/1978 | Whiteside | 364/900 |
| 4,355,303 | 10/1982 | Phillips et al. | 340/310 A |
| 4,408,186 | 10/1983 | Howell | 340/310 A |
| 4,429,299 | 1/1984 | Kabat et al. | 340/310 A X |
| 4,451,853 | 5/1984 | Moriguchi | 340/310 A X |
| 4,507,646 | 3/1985 | Hamlin et al. | 340/310 R |
| 4,517,548 | 5/1985 | Ise et al. | 340/310 R |
| 4,623,871 | 11/1986 | Akano | 340/310 A |
| 4,636,771 | 1/1987 | Ochs | 340/310 A X |
| 4,745,391 | 5/1988 | Gajjar | 340/310 A |
| 4,772,870 | 9/1988 | Reyes | 358/86 |
| 4,790,001 | 12/1988 | Connally et al. | 379/66 |

FOREIGN PATENT DOCUMENTS 2188219 9/1987 United Kingdom .................. 358/86

OTHER PUBLICATIONS

Brochure for Rabbit, "The VCR Multiplying System", by Rabbit Systems, Inc., Santa Monica, Calif.

Primary Examiner—Keith E. George
Attorney, Agent, or Firm—Stetina and Brunda

[57] ABSTRACT

A wideband video system transmits and receives video signals through a ground line of a power distribution network. This single line transmission path is not susceptable to noise signals as is a dual line transmission path. The single line transmission path is grounded in the transmitter by a cable from an incoming source and also grounded in the receivers by respective monitors. Between the incoming source and the monitors, a single communication line carries single ended wide band video signals respecting floating grounds through the transmitter, the ground line and the receivers. This single line transmission is less susceptible to noise on the power lines thereby enabling the transmission of up to 500 mHz signals suitable for video transmission over a wide frequency band.

6 Claims, 5 Drawing Sheets

WIDEBAND VIDEO SYSTEM FOR SINGLE POWER LINE COMMUNICATIONS

RELATED APPLICATIONS

The present invention is a continuation-in-part patent application of U.S. patent application Ser. No. 845,236 filed Mar. 28, 1986 in the name of Pal et al.; entitled Wideband Video System for Single Power Line Communications, now abandoned.

BACKGROUND

The present invention relates to power line communication systems and, particularly, to power line communication systems communicating high frequency signals over existing residential power wiring.

Normally, cable television and regularly broadcasted television signals are routed through cable or flat wire, respectively, to various televisions located at various locations within a residential or commercial facility. When adding a new television, additional cable or flat wire is routed to accommodate the new televisions.

Recently, there have been attempts to communicate over preexisting power distribution networks comprising power, neutral and ground lines routed throughout the residential or commercial facility thereby providing power and signal sources at variously distributed sockets, for example, standard duplex three-prong connectors.

Certain systems have been used to communicate between transmitters and receivers connected to the power distribution networks providing power and communicating signals therebetween.

Some of the earlier versions of these systems utilize conductors of power distribution networks which can be readily tailored to accommodate successful communication. Systems communicating stereophonic signals, closed-circuit television signals, digital signals, image data signals, and radio signals over the primary power distribution networks have been proposed and developed. The most significant problem encountered by these systems is noise.

The previous systems which communicate over residential branch circuits have traditionally utilized the power and neutral conductors as dual communication lines or have used the neutral and ground conductors as dual communication lines. These dual communication lines either generate noise or are receptive to noise by connected loads. Either type of noise poses a significant obstacle to successful communication.

The most common sources of noise in residential power distribution networks are various current switching devices. Typically, such noise is basically transient in nature but may be generated repetitively as in the case of motors. Noise can appear as transient voltages between any two pair of lines of the power distribution network as well as appear as current flowing through the lines of the distribution network. Transient voltage magnitudes can typically range up to 300 volts with frequency components ranging from sixty hertz to hundreds of megahertz.

High frequency noise components pose a particular problem to the transmission of high frequency signals. Heretofore, systems which have been developed for successful power line communications have had to limit their frequency range to lowband regions below hundreds of kilohertz. Because of the use of dual communication lines by the heretofore prior art systems, the noise components with respect to the same have been substantial and have prohibited operation in the high frequency range i.e. hundreds of mega hertz range. The higher the frequency, the smaller the signal that can be transmitted. Hence, the signal to noise ratio is much lower when transmitting at higher frequencies thereby limiting the frequency range of high frequency transmissions. The noise component associated with dual line transmission is of such a great magnitude that the heretofore prior art systems have not been able to successfully communicate in the hundreds of mega hertz range.

As the current loads vary in response to a number of active varying loads on a power distribution network, the amount of current and the voltage level thereon correspondingly varies. It is known that the actual impedance of the dual transmission lines vary as the current and voltage thereon vary. Hence, the impedance into a given point along the power distribution lines varies with corresponding varying loads. It is also well known that impedance matching between the output of dual communication lines and the input of a receiving circuit provides maximum energy transfer and minimizes signal attenuation at the receiving circuit.

Heretofore, power line communications systems have incorporated fixed impedance matching as a means to match the distribution line impedance to a transmitter or receiver input impedance thereby transmitting and receiving at the most effective level. That is to say, when the transmitter or receiver input impedance equals that of the impedance into the distribution line, a maximum energy transfer occurs so as to transmit and receive with the maximum signal possible.

Typically, such prior art systems have measured the line impedance at the time of installation and have set the input impedance of receivers or transmitters to that impedance level thereby matching the distribution line impedance solely at the time of installation. However, because the distribution line varies its impedance from time-to-time in response to varying loads, the match of impedance between the distribution line and the input of the transmitter or receiver changes, resulting in an impedance mismatch and attenuation of the signal from time-to-time. Examples of such prior art systems are numerous.

In Stradley U.S. Pat. No. 3,369,078, stereophonic signals are transmitted with a 1.7 mHz carrier having audio modulation. The transmission occurs on two power lines of an existing power distribution network. A variable inductor providing fixed impedance matching is used to tune the circuits to the carrier frequency.

In Chou et al. U.S. Pat. No. 4,054,910, closed circuit television signals are transmitted using differential input and output wires. DC matching is fixed at time of installation by the use of a potentiometer. The frequency transmission occurs between 5 hertz and 5 mHz which transmission is limited by the frequency range of the amplifier. The circuit therein described requires repeater circuits to compensate for line loss, that is, signal attenuation over the power distribution network.

In Howell U.S. Pat. No. 4,408,186, communication occurs at 160 kilohertz using dual line transmission upon the neutral and ground lines. Again, matched impedance is fixed by inductors.

In Kabat et al. U.S. Pat. No. 4,429,299, digital signals are transmitted between 50 kilohertz and 2 mHz. The system therein disclosed includes transceivers for two way data communications. The neutral and ground lines are used for dual line transmission.

In Moriguchi et al. U.S. Pat. No. 4,451,853, image data transmission of scanned documents is transmitted at about 400 kilohertz and Dual line coupling is required.

In Hamlin et al. U.S. Pat. No. 4,507,646, radio communication having a 20 kilohertz to 500 kilohertz carrier with audio modulation is transmitted over existing power lines. Again, this communication is transmitted over dual power lines. Again, impedance matching is fixed at time of installation by selecting a particular component value and does not correct for variable impedance that occurs in the lines from time to time during use.

A review of these prior issued patents suggest that the current teachings require dual line transmission. The applicant's of the subject application have recognized the limited communicative frequency range due to the low signal to noise ratio that occurs when transmitting at higher frequencies over dual transmission lines. This frequency limitation and fixed impedance mismatching attenuating transmitted signals are solved or reduced by the subject invention.

SUMMARY

An object of the present invention is to provide a transmitter and receiver system for communicating wide band video signals through existing power distribution networks.

Another object of the present invention is to provide a transmitter and receiver system for transmitting wide band video signals over a single communication line with respect to a floating ground through the system.

A further object of the present invention is to provide a transmitter and receiver system for transmitting wide band video signals up to 500 MHz through existing power distribution networks over a single line transmission path therein which signals are grounded at the incoming source and grounded at a receptor but have a floating ground therebetween.

Still a further object of the present invention is to provide for a transmitter and receiver system for communicating wide band video signals through an existing power distribution network, which system includes automatic features adjusting signal amplitudes for proper reception at the receivers thereby compensating for varying impedances of the power distribution network.

Although not limited in scope of application, the herein disclosed transmitter and receiver system is preferably used for residential dwelling transmission and reception of wide band video signals. A video cassette recorder, television cable tuner, antenna or like incoming source means is connected to a transmitter device in a transmitter of the system. The transmitter device is a transmitter impedance matching device having 75 ohm or 300 ohm fixed impedance matching to the incoming source. The transmitter matching device is grounded with respect to incoming source signals from the incoming source.

The incoming source signals are coupled to a single line carrying single ended signals with respect to a floating ground. The single ended signals are amplified through the transmitter and then coupled to a single line, typically the ground line of the power distribution network. Neutral line and power line of the power distribution network are connected to the transmitter for supplying power to various amplifier circuits internal to the transmitter.

A line conditioner and power supply internal to the transmitter provide power and ground references for supplying power to the amplifier circuits in the transmitter. The single ended signals which are amplified in the transmitter, float respecting the power and ground references of the power supply. Hence, the wide band video signals are converted to singled ended signals and are transmitted by the transmitter into only one line, preferably the ground line of the power distribution network, which single ended signals are allowed to float with respect to the power and ground references of the power supply.

Single line transmission such as over only a ground line is not as susceptible to noise components respecting the neutral and power lines of the power distribution network. Hence, the single ended signals do not contain noise components commonly induced upon the dual, neutral and power lines as utilized in the prior art. Therefore, the singe line transmission generally includes a higher signal-to-noise ratio enabling higher frequency transmission.

The present invention also contemplates a plurality of receivers distributed throughout the residence and connected to the power distribution network for receiving the single ended wide band video signals transmitted on only the ground line of the power distribution network. Each of the receivers has its own internal line conditioner and power supply for supplying power to various circuits within the receivers. Each receiver has an automatic gain control device for automatically adjusting the gain of a receiver amplifier which device changes the input impedance of the receiver then compensating for signal loss associated with varying impedance and line loss along the ground line of the power distribution network.

The single ended wide band video signals which are transmitted on the ground line are presented to a wide band filter, and then amplified by a receiver amplifier internal to each of the receivers.

The single ended wide band video signals are then presented to a television, monitor or like receptor displaying a video image. Ground terminals on the television and monitor are connected to the receiver thereby providing a ground reference for the single ended wide band video signals. Hence, the wide band video signals which are transmitted from the transmitter to the receiver, float in the transmitter, float through the ground line and float in the receivers with respect to power and ground references and with respect to the neutral and power lines of the power distribution network.

Consequently, in the transmitter, through the ground line and in the receivers, the wide band video signals do not contain noise components associated with a pair of power lines in a dual line transmission path. The system permits the communication of wide band video signals up to several hundred megahertz while automatically compensating for line loss and impedance mismatch. These and other advantages will become more apparent in the following description of the preferred embodiment.

BRIEF DRAWING DESCRIPTION

DETAILED DESCRIPTION OF THE PREFERRED EMBODIMENT

Figure 1:
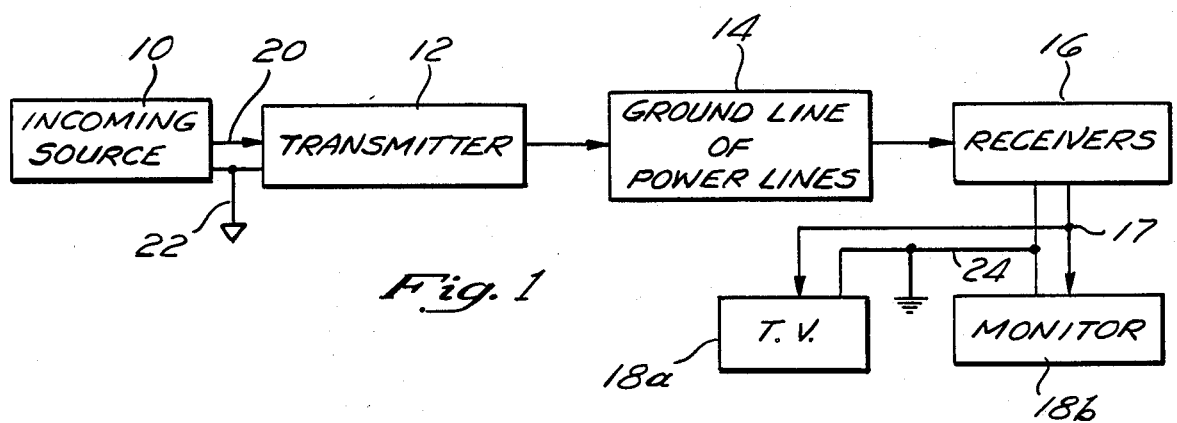
FIG. 1 is a system diagram showing the single line communication path between an incoming source and differing receptors and showing ground connections at the incoming source and the receptors.

Referring to FIG. 1, an incoming source 10 is connected to a transmitter 12 which in turn is connected to one line, typically the ground line 14 of a conventional power distribution network distributing power through residential wiring. The ground line 14 is connected to a plurality of receivers 16 each of which is connected through a respective signal line 17 to a respective television 18a or video monitor 18b. The ground line 14 is a single ended communication line. The incoming source 10 provides the transmitter 12 with a signal on line 20 and another ground line 22 comprising a chassis ground. A wide band video signal on line 20 is referenced to a ground signal on line 22. The transmitter 12 transmits the video signals on line 20 through the ground line 14 to the receivers 16.

The receivers 16 then communicate the wide band video signals to either the television 18a, the monitor 18b or like receptor. Another chassis ground line 24 from either the television 18a or the monitor 18b is provided by the television 18a or monitor 18b for referencing the video signals on the signal line 17. Thus, the present invention allows the video signals to be communicated into any room serviced by the power distribution network in a residential or commercial facility without the need to route separate cable or flat wire for each receptor 18a, 18b.

As may be now appreciated from this configuration, the wide band video signals propagate through the transmitter 12, through the communication ground line 14 and through receivers 16 while being referenced to ground at the incoming source 10 by virtue of ground line 22, and referenced to ground at the television or monitor 18 by virtue of a corresponding ground line 24. When supplying power to various loads connected to the power distribution network, the loads superimpose noise signals across two conductors thereof by virtue of their varying power requirements. Because the transmission is over the single communication line 14 from the transmitter 12 to the receivers 16, noise components on the single communication line 14 are not as severe as those noise components associated with dual communication lines connected to various loads.

Figure 2:
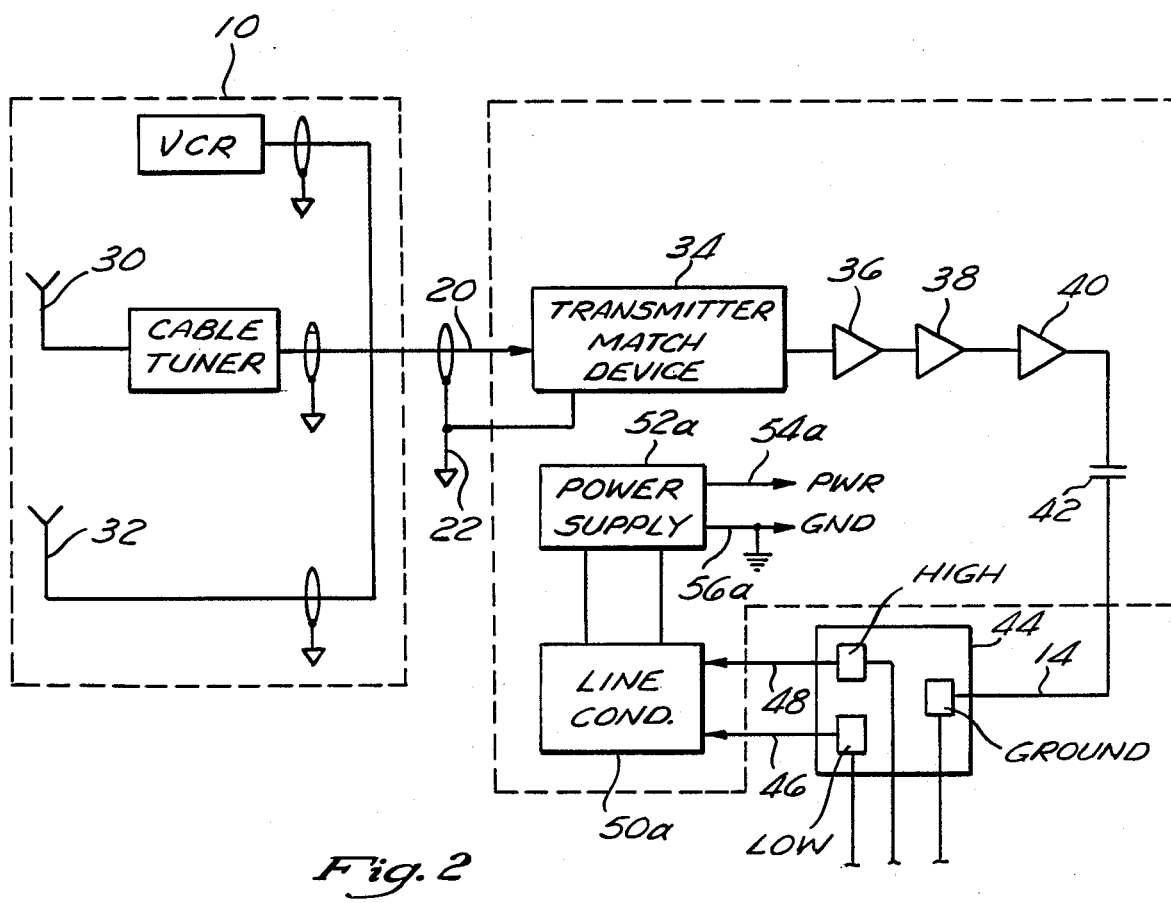
FIG. 2 is a detailed block diagram depicting the incoming source connected to a transmitter which is in turn connected to a power distribution network.
Figure 3:
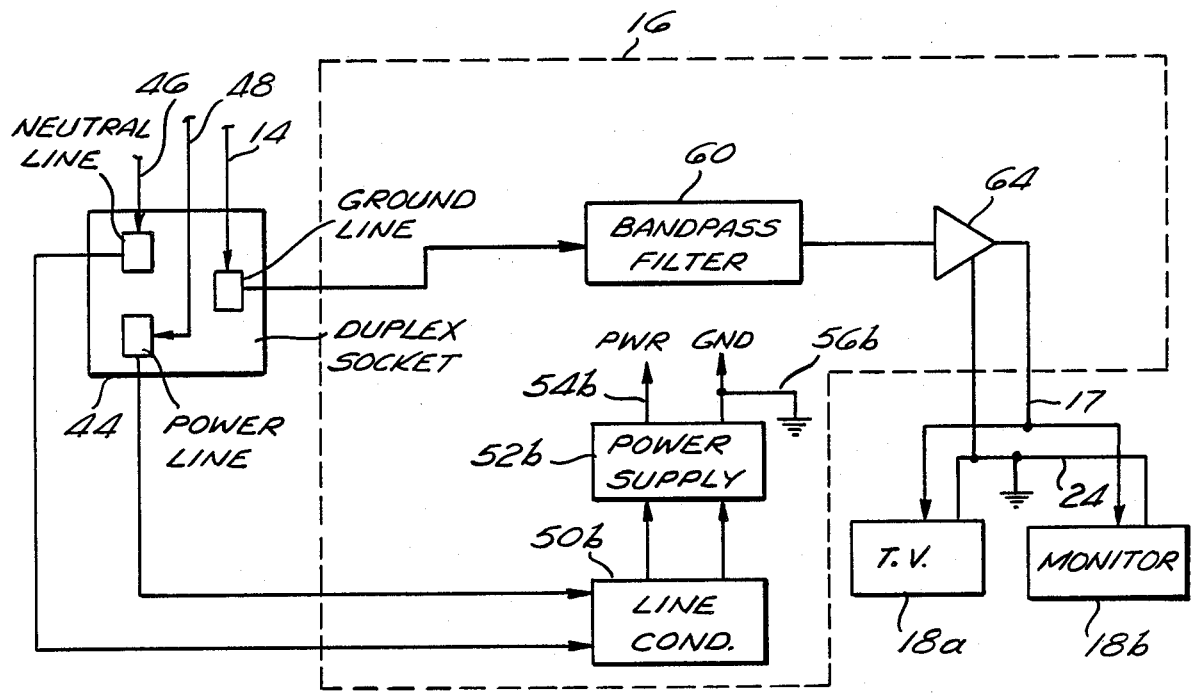
FIG. 3 is a detailed block diagram of a receiver connected to the power distribution network and the receptors.

Referring to FIGS. 1, 2 and 3, the incoming source 10 may be one of a variety of sources. For example, the incoming source may be a video cassette recorder 26, a cable television tuner 28 which is connected to a cable station or transmitter 30, or an antenna 32 receiving broadcasted wide band video signals for television. The incoming source 10 provides a dual line transmission path comprising the signal carrier line 20 and a grounded line 22 connected to the transmitter 12.

The video signals on lines 20 and 22 are presented to the transmitter 12 and more specifically to a 300 to 75 ohm transmitting matching device 34. The transmitting matching device 34 outputs single ended signals for amplification by amplifiers 36, 38 and 40. Amplifiers 36, 38 and 40 are used to amplify the single ended wide band video signals coming from the transmitter matching device 34. The amplifier 40 presents the single ended wide band video signals coupled through a capacitor 42 to the ground communication line 14 of the power line distribution network provided at a conventional duplex wall socket 44. A neutral line 46 and a power line 48 are connected to a line conditioner 50a which supplies filtered AC power signals to a power supply 52a. The power supply 52a provides a power reference 54a and a ground reference 56a. The power supply 52a supplies power to the amplifiers 36, 38 and 40.

The transmitter 12 is connected to the power line distribution network through an electrical cord having a three prong plug (not shown) inserted into the wall socket 44 thereby connecting the transmitter 12 to the power distribution network comprising lines 14, 46 and 48.

A receiver 16 is connected to the power distribution network comprising lines 14, 46 and 48 through an electrical cord having a three prong plug inserted into the socket 44. The receiver 16 may be connected anywhere along the power distribution network.

The ground communication line 14 is connected to a band pass filter 60 which is used to filter low and high frequency signal components. The single ended wide band video signals are then presented to an amplifier 64 having variable input impedance and automatic gain control.

The amplifier 64 amplifies the single ended wide band video signals presented by the band pass filter 60 and present amplified video signals to the television 18a or monitor 18b through the signal line 17 respecting the ground line 24.

The receiver 16 also includes a line conditioner 50b providing a filtered AC voltage signal to a power supply 52b which in turn provides a power reference 54b and a ground reference 56b. The ground reference 56b is connected to the ground line 24 of the television 18a or monitor 18b so as to then reference to ground the video signals on signal line 17.

From the above, it may now be appreciated by those skilled in the art, that single ended wide band video signals propagate through the transmitter 12, the ground communication lines 14, and the receiver 16 respecting a floating ground. That is, the single ended signals are referenced to ground at the transmitter matching device and the receptors, but float therebetween respecting the power reference 54 and the ground reference 56. As such, noise components associated with dual line transmission do not interfere with the single ended wide band signals, because of the lack of a ground reference and the lack of varying loads causing superimposed noise thereon. It may also be apparent that the incoming source 10 can provide wide band video signals by virtue of an antenna signal from antenna 32 or a selected frequency signal by virtue of selecting a single channel using the cable tuner 28 or VCR 26. Hence, the herein disclosed transmitter and receiver system is adapted for suitably operating a plurality of receptors 18 including televisions or monitors distributed throughout a residence through antenna reception, cable transmission or VCR transmission.

Figure 10:
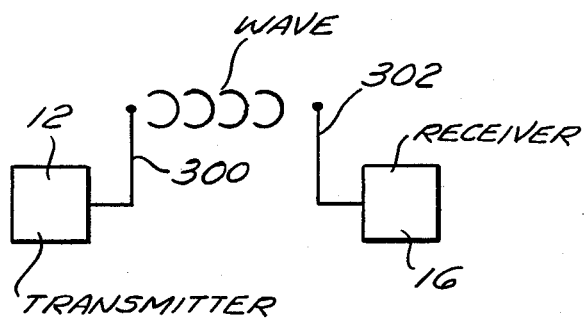
FIG. 10 is a schematic view of the propagation of a wave signal through a medium.

A full understanding of the floating ground concept used in the present invention may be obtained by review of the principals of electro-magnetic wave propagation through a medium. An electrical magnetic wave as propagated from a point of generation (i.e. the transmitter) to a point of reception (i.e. the receiver) through or along a medium is known to take a single path of communication through the medium. The characteristics of the electro-magnetic wave comprise electric and magnetic vectors, with the electric vector being characterized by electric field strength and dialectric dispersement while the magnetic field is characterized by magnetic field strength and flux density. The relationship between the members of various pairs of field vectors is characterized by the parameters or electrical constants of the medium. For example, as schematically depicted in FIG. 10, an electro-magnetic wave generator, i.e. transmitter, 12 generates a specific type of signal that can be propagated through a medium (such as air) by using an antenna 300. The propagated signal comprises a unidirectional or multidirectional single path wave form. Within the field of propagation, a receiving device, i.e. receiver 16, may be provided which through the use of an additional antenna 302 receives the propagated wave and processes the wave signal for a specific use. The transmitter 12 and receiver 16 are electrically independent of each other, but both utilize antennas 300 and 302 for transmitting and receiving the wave signal.

Figure 11:
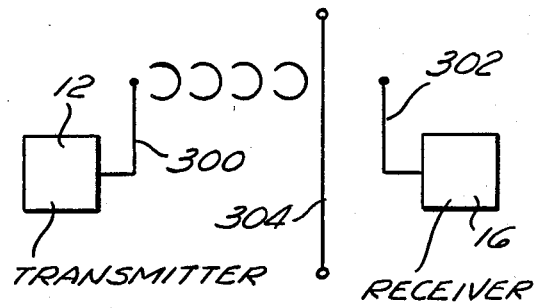
FIG. 11 is a schematic view of the propagation of a wave signal to an open wire conductor.
Figure 12:
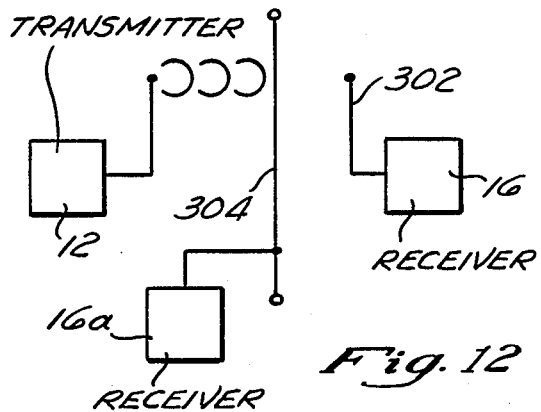
FIG. 12 is a schematic view of FIG. 11 having a receiver connected to the open wire conductor.
Figure 13:
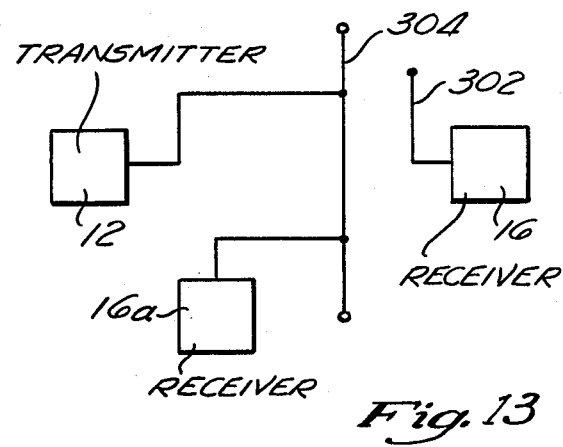
FIG. 13 is a schematic view of FIG. 12 having the transmitter connected to the open wire conductor.

In addition to the transmitter 12 and receiver 16 depicted in FIG. 10, a third device referred to as a single or open wire 304 comprising a bare electrical conductor may be disposed within the wave propagation field as depicted in FIG. 11. The open conductor 304 of an undefined length will act as a conductive obstacle to the propagated wave and as such will be induced by the propagated wave whereby the open conductor 304 comprises a conductive path for the wave signal. If an additional receiving device, i.e. receiver 16(a), is directly coupled to the open conductor 304, the conductor may also serve as an antenna for the receiver 16(a) as depicted in FIG. 12. The ability of the open wire conductor 304 to serve as an antenna for the receiver 16(a) can also be applied to other receivers 16 ad to the transmitter 12. In such an embodiment, instead of using the transmitter antenna 300 to send a signal through the medium, the transmitter 12 may be directly coupled to the open wire conductor 304 as depicted in FIG. 13, wherein the open wire conductor 304 serves as a common wave path between the transmitter 12 and the receiver 16(a). The transmitter 12 and receiver 16(a) are still electrically independent of each other, however, both utilize the common communication path, i.e. the open wire conductor 304 therebetween. As such, it will be recognized that the signal transmitted by the transmitter 12 is propagated through the common open wire conductor 304 to the receiver 16(a) which signal (1) does not require a return path (2), may be propagated through the open wire conductor 304 irrespective of differences in the electrical impedance of the transmitter 12 and receiver 16(a) and (3) may be propagated through the open wire 304 irrespective of the grounds required by the electronic circuitry of the transmitter 12 and receiver 16(a). As such, the propagated signal through the open wire conductor 304 may in effect ignore the electronic circuitry of the transmitter 12 and receiver 16(a).

As is well known, the transmitter 12 comprises a device that will generate the signal and transmit the same into the air or through a different type of communication medium. The required electric ground for the transmitter 12 will provide the required DC grounding for the electronic circuitry of the transmitter 12. This signal transmitted by the transmitter is not electrically connected in any way with the DC grounding of the circuitry of the transmitter 12 or receiver 16(a).

Figure 14:
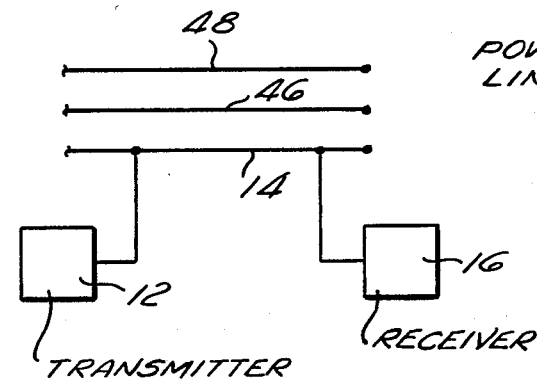
FIG. 14 is a schematic view of a transmitter and receiver connected to one wire of a power distribution network.
Figure 15:
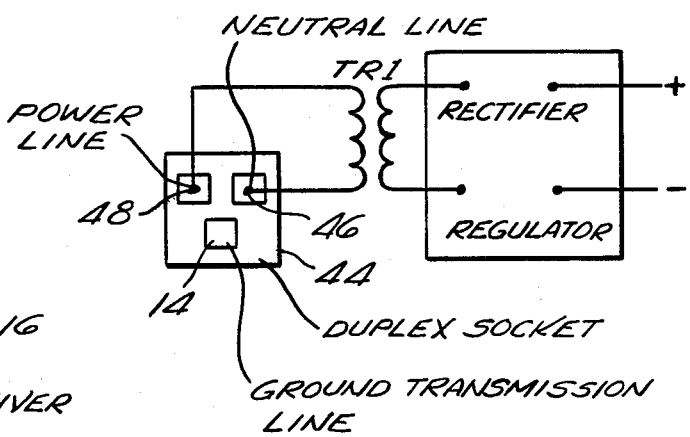
FIG. 15 is a schematic view of a transformer connected to the power distribution network.

The application of the above referenced principals of signal propagation between a transmitter and receiver to the present invention, is illustrated in FIG. 14, wherein the ground communication line 14, neutral line 46 and power line 48 of a conventional residential power distribution network providing 115 volts AC 50/60 Hz is depicted. The transmitter 12 and receiver 16 may be connected to any one of the three lines 14, 46, and 48, however in the preferred embodiment are connected to the ground communication line 14 of the power distribution network. As such, the ground communication line 14 forms an open ended communication path between signals transmitted via the transmitter 12 and received by the receiver 16. In the preferred embodiment, the frequencies of this signal transmitted by the transmitter 12 is in the ultra high band range (MHz). Both for the transmitter 12 and receiver 16, a linear power supply 52a is used to provide the necessary voltages for the electronics of the transmitter 12 and receiver 16. Referring to FIG. 15, it is shown that the input of the transformer for the power supply 52a comprises 115 volts AC which is received from the power 48 and neutral line 46 of the power distribution network via the duplex socket 44. The transformer TR1 comprises a step down transformer which is known to react as a shunt for high frequency signals (i.e. propagated waves) induced directly or indirectly on the power distribution lines and hence high frequency signals will be stopped or rejected at the transformer TR1. This provides the required separation between the transmitter 12 or receiver's 16 power supply DC ground and the propagated wave signal through the ground transmission line 14.

The term floating ground is therefore utilized to indicate that the signal, i.e. the propagated video signal upon the ground communication line 14, is electrically independent with respect to the transmitters 12 or receiver's 16 electronic circuitry and that the single communication path formed by the ground communication line 14 from the transmitter 12 is independent of the electrical grounds (or return path) required by the electronic circuitry of the transmitter 12 and receiver 16. As such, the present invention comprises a single line communication system where the electronic circuitry and DC grounds in the transmitter 12 and receiver 16 are independent or floating in respect to the video signal communicated between the transmitter 12 and receiver 16 using any one of the three lines 14, 46 or 48 of the power distribution network.

Figure 4:
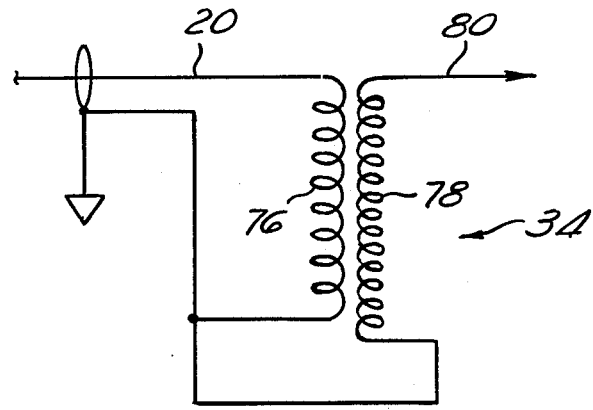
FIG. 4 is a schematic diagram of a transmitter matching device.

Referring to FIGS. 2 and 4, the transmitter matching device 34 comprises a transformer having a 300 ohm primary winding 76 and a 75 ohm secondary winding 78 for impedance matching flat antenna wire to coaxial cable connections. The primary winding 76 is connected to the signal line 20 and the ground line 22. The wide band video signals are coupled across to the secondary winding 78. The secondary winding 78 is connected also to the ground line 22 and presents a single ended output on a single ended line 80. Hence, the transmitter matching device 34 is used to convert the video signals on lines 20 and 22 into single ended signals on line 80. The transformer 76 and 78 need not be used when connected directly to a 75 ohm coaxial cable.

Figure 5:
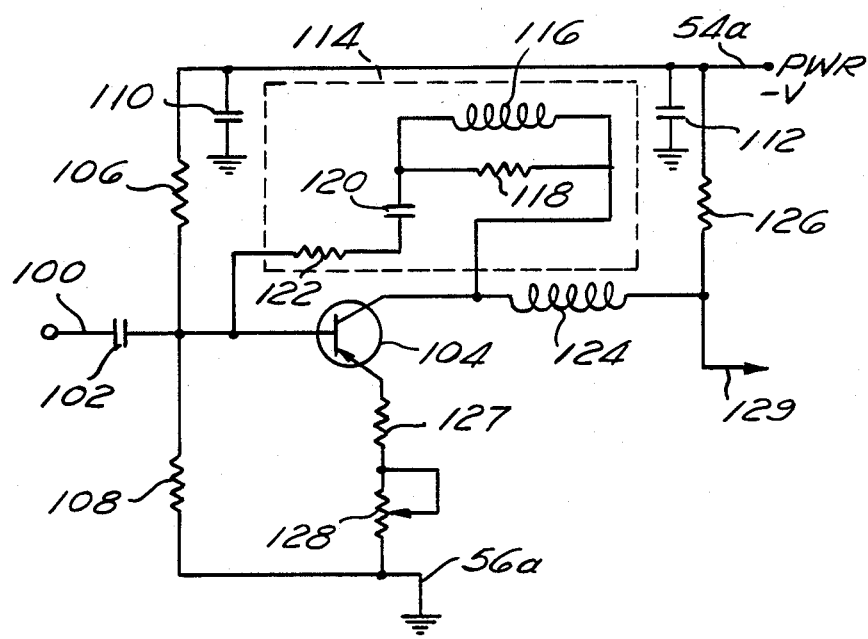
FIG. 5 is a schematic diagram of an amplifier circuit in the transmitter or receiver.

Referring to FIGS. 2, 3, 4 and 5, the schematic of an amplifier depicted in FIG. 5 represents each amplifier 36, 38, and 40. The amplifier has an input line 100 upon which is carried single ended wide band video signals which are then coupled through a 0.001 microfarad coupling capacitor 102 to the base of a 2N4957 PNP transistor 104. The transistor 104 is used to amplify the incoming video signals. A 43k ohm bias resistor 106 and a 33k ohm bias resistor 108 bias the base terminal of the transistor 104. Bias resistors 106 and 108 receive power from the power supply 52a which is connected to the bias resistors 106 and 108 through power reference 54a and ground reference 56a, respectively.

Two 100 microfarad filter capacitors 110 and 112 are distributed about the amplifier circuit for filtering any unwanted noise on the power reference 54a. The transistor 104 has a tuned feedback network 114 comprising a 3.5 turn 0.25 inch diameter inductor 116 in parallel with a 360 ohm resistor 118 both of which are connected in series to a 0.001 microfarad capacitor 120 and a 150 ohm resistor 122. The tuned feedback network 114 is connected between the collector and the base terminals of the transistor 104 for providing negative feedback and stabilized gain of the amplifier through the wide band video frequency range.

A six turn 0.25 inch diameter inductor 124 and a 1k ohm resistor 126 are connected in series between the power supply reference 54 ad the collector of the transistor 104 for providing DC biasing and small signal loading for the transistor 104.

A 100 ohm emitter resistor 127 is connected in series with a 50 ohm potentiometer 128 for selective amplification gain at the time of installation. Only amplifier 40 of the transmitter 12 has the resistor 127 and the potentiometer 128. The other amplifiers 36 and 38 have the emitter of transistor 104 connected to ground for fixed amplification.

An output line 129 presents amplified single ended wide band video signals to the next amplifier or coupling capacitor 42. Inductor 124 in combination with a capacitor 102 of the next succeeding amplifier or coupling capacitor 42 provide for impedance matching between the amplifiers or between the amplifier 40 and the ground line 14. Hence, a series LC circuit exists between the various circuits for impedance matching.

Figure 6:
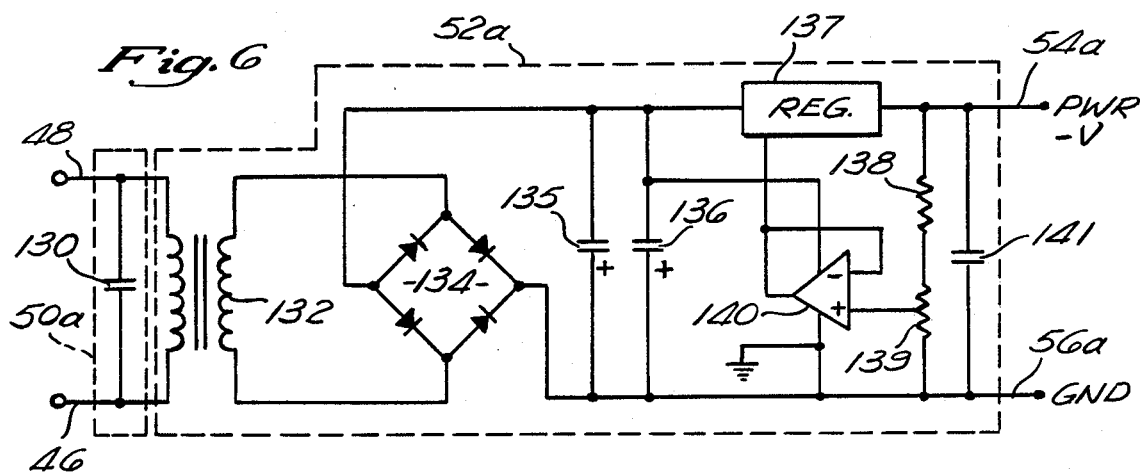
FIG. 6 is a schematic diagram of a line conditioner and a power supply providing power and ground references in the transmitter and receiver.

Referring to FIGS. 2, 3 and 6, in the transmitter 12, the line conditioner comprises a 0.1 microfarad filter capacitor 130 which is used for filtering high volt transients and noise between the power line 48 and the neutral line 46. The filter capacitor 130 is connected in parallel across the primary of a stepdown (30 VAC) transformer 132 of the power supply 52. The secondary winding of the transformer 32 is connected to a conventional rectifying bridge 134 which is in turn connected across a 2 millifarad capacitor 135 and a 0.2 microfarad capacitor 136 used for establishing a filtered DC voltage with a reduced ripple component into an A79M05 regulator 137.

Capacitors 135 and 136 are used to filter noise with capacitor 135 filtering low component frequency noise while capacitor 136 filters high frequency component noise. The regulator 137 is used as is well known in the art, to provide a stable DC voltage reference on the power reference 54a. In this preferred embodiment, a negative power reference 54a is set by the regulator 137 at approximately minus 15 volts respecting the ground reference 56a.

A 100 ohm resistor 138 and 10k ohm potentiometer 139 are connected in series between the minus power reference 54a and the ground reference 56a. The varying terminal of the potentiometer 139 is used to provide a 741 amplifier 140 with a voltage signal that is a proportional to the voltage difference between the power reference 54a and the ground reference 56a. This voltage signal is buffered by the amplifier 140 which provides a buffered output signal to the voltage regulator 137 for controlling and regulating the power reference 54a. A 0.1 microfarad filter capacitor 141 is connected between the power reference 54a and the ground reference 56a for filtering noise therebetween. The power supply 52a provides power through the power reference 54a and the ground reference 56a. The power supply 52a supplies power to the amplifiers 36, 38, and 40. Those skilled in the art should readily appreciate differing regulator power supply designs and fully understand the operation of the one herein disclosed.

Figure 7:
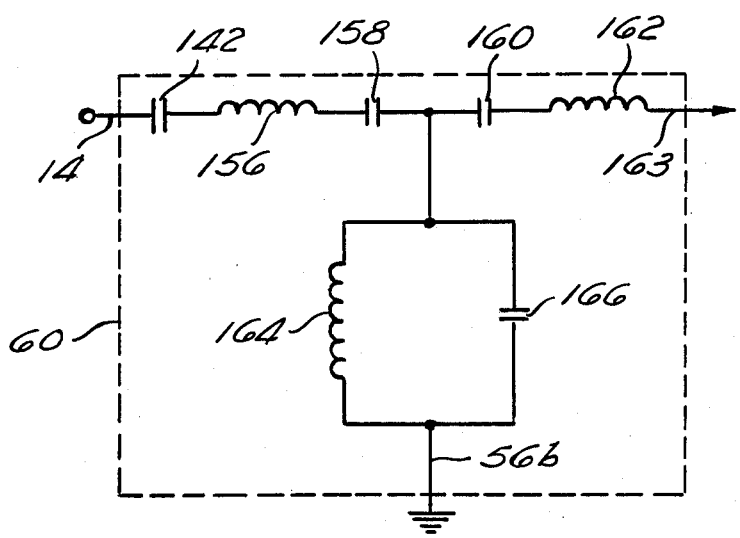
FIG. 7 is a schematic diagram of a tuned circuit providing wide band filtering.

Referring to FIGS. 3 and 7, filter 60 has a DC blocking 10 microfarad capacitor 142 which blocks DC voltages and currents on the ground line 14 but couples the single ended video signals. The band pass filter further comprises serial components including a 9.0 microhenry inductor 156, a 0.01 microfarad capacitor 158, a 0.01 microfarad capacitor 160 and a 9.0 microhenry inductor 162, the latter of which provides an output to the amplifier 64 on line 163. Between capacitors 158 and 160 is connected a resonant parallel LC circuit comprising a 3.5 microhenry inductor 164 and a 22 microfarad capacitor 166. The band pass filter 60 filters high and low frequency noise components while passing the single ended wide band video signals.

It should now become apparent that the preferred embodiment provides for single line transmission path for single ended wide band video signals through the transmitter 12, the ground communication line 14 and a plurality of receivers 16 distributed throughout a facility having the power distribution network therethrough. Because of this single line transmission path, noise signals associated with dual line transmissions are not encountered thereby providing a means through which video signals in the hundreds of megahertz range can be transmitted throughout a facility having a preexisting power distribution network.

Figure 8:
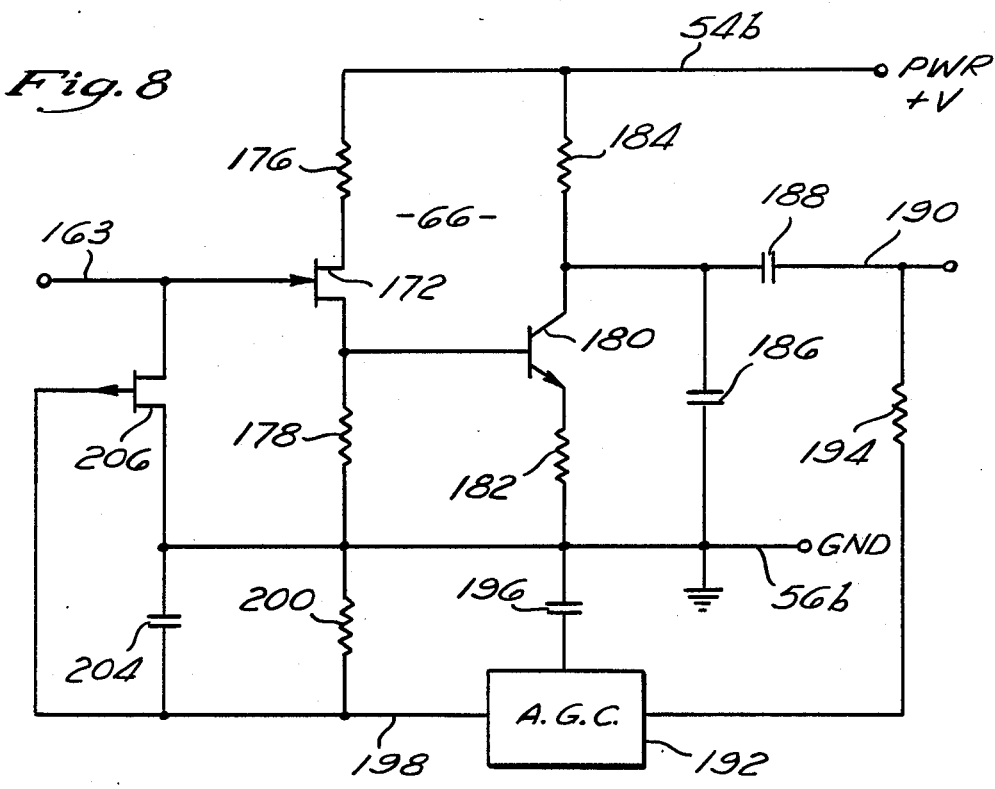
FIG. 8 is a schematic diagram of a receiver amplifier having automatic gain control and variable input impedance.
Figure 9:
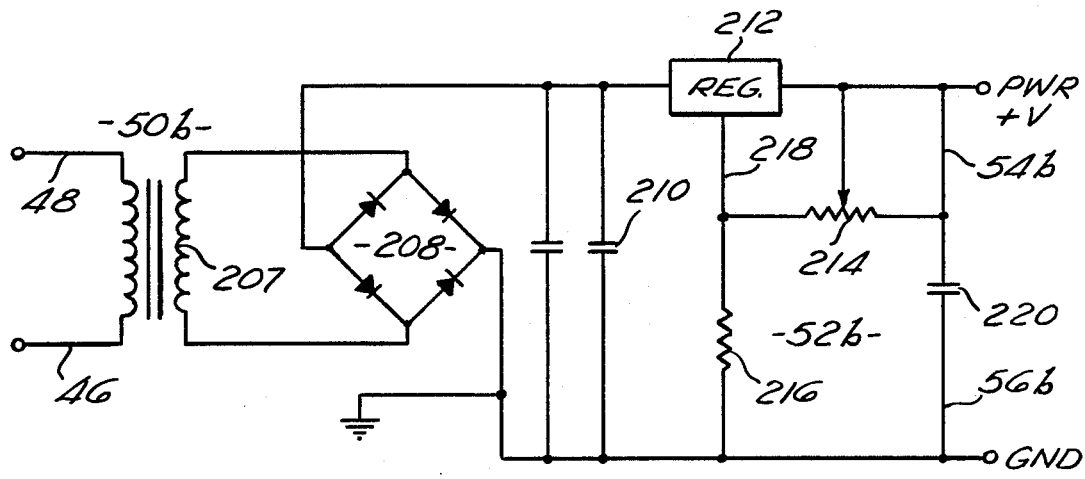
FIG. 9 is a schematic diagram of a receiver power supply.

Referring to FIGS. 3, 8 and 9, the receiver 16 comprises a different power supply 52b and a different amplifier 64 depicted by way of a schematic representation in FIGS. 9 and 8, respectively. The amplifier 64 features automatic adjustment of the gain amplification of incoming wide band video signals and feature variable input impedance. This automatic gain control feature senses the output of the amplifier 64 and feeds back to the input DC signal for varying the input impedance looking into the amplifier 64 so as to compensate for varying impedances on the ground line 14 of the power distribution network.

The band pass filter 60 provides the single ended wide band video signals on the input line 163. The wide band video signals are presented to an input N channel field effect transistor 172. The field effect transistor (FET) 172 has its drain terminal connected to a 1k ohm drain resistor 176 which is in turn connected to the power reference 54b which is plus 15 volts in the preferred embodiment.

The source terminal of the FET 172 is connected to a 30 ohm source resistor 178 which in turn is connected to the ground reference 56b. The source terminal of the FET 172 is also connected to the base terminal of a MPS6543 NPN transistor 180. The input circuit comprising the FET 172, drain resistor 176 and source resistor 178 provide buffered video signals to the transistor 180 while providing a high input impedance on line 163. The video signals presented to the base terminal of the transistor 180 is inverted from th input signals as is common with transistor amplifier circuits.

The PNP transistor 180 has its emitter terminal connected to a 180 ohm emitter resistor 182 which in turn is connected to the ground reference 56b. The collector terminal of the NPN transistor 180 is connected to a 1k ohm collector resistor 184 which in turn is connected to the power reference 54b. This second amplifying stage comprising transistor 180 and resistors 182 and 184 also provide amplification and inversion of the incoming wide band video signals at the base terminal of transistor 180.

The gain of this second amplifier stage is proportional to the ratio of the resistance values between the collector resistor 184 and the emitter resistor 182. The non-inverted amplified wide band video signal presented from the collector terminal of the transistor 180 is filtered by a 2.5 picofarad filter capacitor 186 which is connected between the collector terminal of the transistor 180 and the ground reference 56b. A 0.1 microfarad coupling capacitor 188 is connected to the collector terminal of the transistor 180 and couples the amplified wide band video signals thereon onto an output line 190.

An NE570 automatic gain control device 192 is connected to the output line 190 through a 10k output resistor 194. Such automatic gain control devices are known in the art to provide DC output signals depending upon the corresponding AC input signals.

The automatic gain control device 192 is connected to another 0.1 microfarad filter capacitor 196 which is in turn connected to the ground reference 56b for filtering noise in the automatic gain control device 192. The automatic gain control device 192 has an output on line 198 connected to an RC network comprising a 10k ohm resistor 200 and a 0.1 microfarad filter capacitor 204, all of which are in turn connected to the gate terminal of a P channel field effect transistor 206. The FET 206 has its source terminal connected to the ground reference 56b and has its drain terminal connected to the input line 163.

In operation, the automatic gain control device 192 senses amplified wide band video signals on output line 190 through the output resistor 194. Depending upon the amplitude of the wide band video signals, a DC voltage is correspondingly presented at the output on line 198. The output signal from the automatic gain control device 192 is filtered trough the filter capacitor 204 and resistor 200 on line 198 driving the gate terminals of the FET 206.

The FET 206 has an output resistance between its drain and source terminals, that is between the input line 163 and the ground reference 54b, which resistance varies dependent upon the DC voltage on its gate terminal. Therefore, the FET 206 provides for a varying resistance between line 163 and the ground reference line 56b. Hence, the automatic gain control device 192 is used to vary the input impedance into the amplifier 64 dependant upon the amplified wide band video signals on line 190, as a means to shunt to the ground reference 56b or couple to the FET 172 the incoming video signals on line 163.

It should now become apparent that in the preferred embodiment, the invention herein disclosed provides for means capable of varying the input impedance of the amplifier 64, thereby varying the gain of the amplifier 64, and thereby compensating for varying impedance on ground line 14 of the power distribution network.

In the preferred embodiment including the amplifier depicted in FIG. 8, a different receiver power supply 52b is used in the receiver 16 for supplying power to the amplifier 64 with a positive power reference 54b. The receiver power supply 52b is shown by way of schematic representation in FIG. 9.

Referring to FIG. 9, filtered AC power on lines 48 and 46 of the power distribution network are connected to an input transformer 207 which in turn is connected to a conventional rectifier bridge 208. Rectifier bridge 208 is connected in parallel to both a 2 millifarad 50 volt filtering capacitor 209 and a 0.1 microfarad capacitor 210. Capacitor 210 is used for filtering very high frequency noise components whereas capacitor 209 is used to filter low frequency noise components.

Capacitors 209 and 210 are connected between the ground reference line 56b and the input of an A78GHV voltage regulator 212. Voltage regulator 212 provides a stable positive voltage reference on power reference 54b. A 25k ohm potentiometer 214 and a 5k ohm resistor 216 are connected in series between the power reference 54b and the ground reference 56b. The potentiometer 214 and resistor 216 are used to provide a voltage signal on line 218 to the voltage regulator 212. The potentiometer 214 is used to select a particular positive voltage reference on the power reference 54b as is well known in the art. In the preferred embodiment, the power supply 52b is set for positive 15 volts. Those skilled in the art may readily appreciate and understand this type of power supply regulation as is commonly known in the art.

It should also become readily apparent that the automatic gain control feature provides for gain modification and adjustment in the event of amplitude attenuation of video signals communicated through the power distribution network caused by line loss or impedance mismatch of various circuits. Those skilled in the art may readily conceive and invent transmitters and receivers having different design or modifications which may nonetheless represent applications and principles within the spirit and scope of the present invention as defined by the following claims.

What is claimed is:

1. A power line communication system for communicating wide band video signals between an incoming source having dual line outputs and at least one receptor having dual line inputs, over a single line within a power distribution network, comprising:
    a transmitter for receiving said video signals from said dual line outputs and for presenting said signals onto said single line, and
    a receiver for receiving said signals on said single line, and for presenting said signals onto said dual line inputs, said transmitter and receiver having grounds which are isolated from said single line.

2. The system of claim 1 wherein said transmitter comprises:
    power supply means for supplying power, said power supply providing a ground reference, and
    an amplifier for amplifying said signals, said amplifier having a single ended input and a single ended output, said amplifier connected between one of said dual line outputs and said single line, said amplifier connected to and receiving power from said power supply means.

3. The system of claim 1 wherein said receiver comprises:
    power supply for supplying power, said power supply providing a ground reference, and
    an amplifier for amplifying said signals, said amplifier connected between said single line and one of said dual line inputs, said amplifier connected to and receiving power from said power supply.

4. The system of claim 3 wherein said receiver further comprises automatic gain control means for sensing the output of said amplifier and for adjusting the amplification of said amplifier.

5. The system of claim 4 wherein said automatic gain control means comprises:
    automatic gain control device for sensing said output of said amplifier and for providing a control output signal, and
    variable means receiving said control output signal for varying the gain of said amplifier.

6. The system of claim 3 wherein said receiver further comprises automatic control means for compensating for impedance variations or line loss on said single line.

* * * * *